(12) United States Patent
Potter

(10) Patent No.: US 6,755,422 B2
(45) Date of Patent: Jun. 29, 2004

(54) LOW PERMEATION SEALING MEMBER

(75) Inventor: James F. Potter, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/222,063

(22) Filed: Aug. 16, 2002

(65) Prior Publication Data
US 2004/0032092 A1 Feb. 19, 2004

(51) Int. Cl.[7] .............................................. F16J 15/10
(52) U.S. Cl. ...................... 277/652; 277/627; 277/654; 277/644
(58) Field of Search ............................... 277/592, 627, 277/650, 652–4, 644, 647

(56) References Cited

U.S. PATENT DOCUMENTS

| | | | | |
|---|---|---|---|---|
| 2,494,598 A | * | 1/1950 | Waring | 277/584 |
| 2,597,976 A | * | 5/1952 | Cousins | 428/66.4 |
| 2,733,969 A | * | 2/1956 | Polk | 277/558 |
| 2,859,061 A | | 11/1958 | Reid | |
| 3,140,342 A | * | 7/1964 | Ehrreich et al. | 174/35 GC |
| 3,167,324 A | * | 1/1965 | Kratochvil | 277/601 |
| 3,169,776 A | | 2/1965 | Felt | |
| 3,322,433 A | | 5/1967 | Rentschler | |
| 3,418,001 A | | 12/1968 | Rentschler et al. | |
| 3,549,156 A | * | 12/1970 | Van Vleet | 277/652 |
| 3,572,735 A | * | 3/1971 | Dryer | 277/637 |
| 3,603,603 A | | 9/1971 | Woodson | |
| 3,775,832 A | * | 12/1973 | Werra | 29/450 |
| 3,851,888 A | | 12/1974 | Limpson, Jr. et al. | |
| 3,854,736 A | | 12/1974 | Farnam | |
| 4,154,426 A | * | 5/1979 | Santy et al. | 251/175 |
| 4,218,067 A | | 8/1980 | Halling | |
| 4,588,309 A | * | 5/1986 | Uyehara et al. | 384/94 |
| 4,779,903 A | | 10/1988 | Maier et al. | |
| 4,915,355 A | | 4/1990 | Fort | |
| 5,022,663 A | | 6/1991 | Fages et al. | |
| 5,112,664 A | * | 5/1992 | Waterland, III | 428/76 |
| 5,538,262 A | * | 7/1996 | Matsumura | 277/608 |
| 5,551,707 A | * | 9/1996 | Pauley et al. | 277/654 |
| 5,722,668 A | * | 3/1998 | Rice et al. | 277/650 |
| 5,988,268 A | | 11/1999 | Usami et al. | |
| 6,173,970 B1 | | 1/2001 | Choudary et al. | |
| 6,325,384 B1 | * | 12/2001 | Berry et al. | 277/437 |
| 6,419,282 B1 | * | 7/2002 | Hornby | 285/319 |
| 6,443,502 B1 | * | 9/2002 | Iida et al. | 285/351 |
| 6,543,785 B1 | * | 4/2003 | Katayama et al. | 277/534 |
| 6,576,342 B1 | * | 6/2003 | Cerf et al. | 428/413 |
| 6,586,064 B1 | * | 7/2003 | Abu-Isa | 428/36.6 |

FOREIGN PATENT DOCUMENTS

GB    970 653    9/1964

* cited by examiner

Primary Examiner—Alison K. Pickard
(74) Attorney, Agent, or Firm—Brinks Hofer Gilson & Lione

(57) ABSTRACT

The present invention involves a low permeation sealing member for reducing permeation of hydrocarbons from a vessel. The low permeation sealing member comprises an elongated body having a contact surface and a low permeation barrier layer attached along the contact surface of the elongated body. The low permeation barrier layer has opposite edges spaced apart to define a slot. The low permeation barrier layer partially covers the elongated body to allow the elongated body to expand through the slot. The low permeation barrier layer has an outer side configured for contacting hydrocarbons from the vessel to reduce permeation of the hydrocarbons therefrom.

18 Claims, 2 Drawing Sheets

LOW PERMEATION SEALING MEMBER

BACKGROUND OF THE INVENTION

The present invention relates to a low permeation sealing member for reducing permeation of hydrocarbons from a vessel or tank.

Fluid tanks are common in several industries. For example, fuel tanks for motorized vehicles have been used for many years. Many of the current fuel tanks installed in motorized vehicles are made of various materials through which fuel molecules permeate.

Manufacturers of fuel tanks have been challenged in reducing hydrocarbon escape, leakage and permeation from fuel tanks to the atmosphere. An interface between a tank wall and a fuel delivery module cover is one issue of hydrocarbon permeation which many fuel tank manufacturers work to reduce. One problem which fuel tank manufacturers have experienced is related to hydrocarbon fuel molecules or particles permeating through a sealing member material. As hydrocarbon molecules are permeated and/or absorbed through the sealing member material, part of the sealing member expands in size due to absorption of the hydrocarbon molecules until the hydrocarbon molecules permeate through the material. At times, this results in material cracking.

Another problem that fuel tank manufacturers have experienced is hydrocarbon "micro-leaks," wherein hydrocarbon molecules leak and escape between the surfaces of the sealing member, the fuel tank, and the fuel delivery module cover. Many sealing members are at least partially comprised of low permeation material which is relatively stiff and not durable. Typically, the properties of low permeation and sealing ability are inversely related. Thus, as a material increases its characteristic as a low permeation material, the material typically becomes more rigid and allows more micro-leaks between surfaces. In many situations, a low permeation material, when engaged with a tank wall surface, allows a considerable amount of hydrocarbon micro-leaks therebetween.

Thus manufacturers have been challenged in implementing low permeation materials in sealing members to reduce diffusion of hydrocarbons through the sealing members yet maintain durability of the sealing member to reduce hydrocarbon micro-leaks between surfaces of a vessel, the material, and a sealing assembly.

BRIEF SUMMARY OF THE INVENTION

The present invention provides an improved low permeation sealing member for reducing permeation of hydrocarbons from a vessel. The low permeation sealing member is configured to reduce both hydrocarbon diffusion through material of a sealing member and reduce micro-leaks between surfaces of the sealing member, a fuel tank wall, and a sealing assembly. This is accomplished by configuring a low permeation sealing member having both low permeation material to reduce movement of hydrocarbons through the sealing member material and an elastic, durable material to aid in reducing micro-leaks.

The low permeation sealing member includes an elongated body having a contact surface and a low permeation barrier layer attached along the contact surface of the elongated elastic body. The low permeation barrier layer has opposite edges spaced apart to define a slot. The low permeation barrier layer partially covers the elongated body to allow the elongated body to expand through the slot when hydrocarbon molecules are permeated therein. The elongated elastic body provides the low permeation barrier layer with a durable, elastic property which allows the barrier layer to be compressible for radially inward forces. The low permeation barrier layer has an outer side which is configured for contacting hydrocarbon particles from the vessel to reduce permeation of hydrocarbons therefrom.

Further aspects, features and advantages of the invention will become apparent from consideration of the following description and the appended claims when taken in connection with the accompanying drawings.

DETAILED DESCRIPTION OF THE INVENTION

Figure 1:
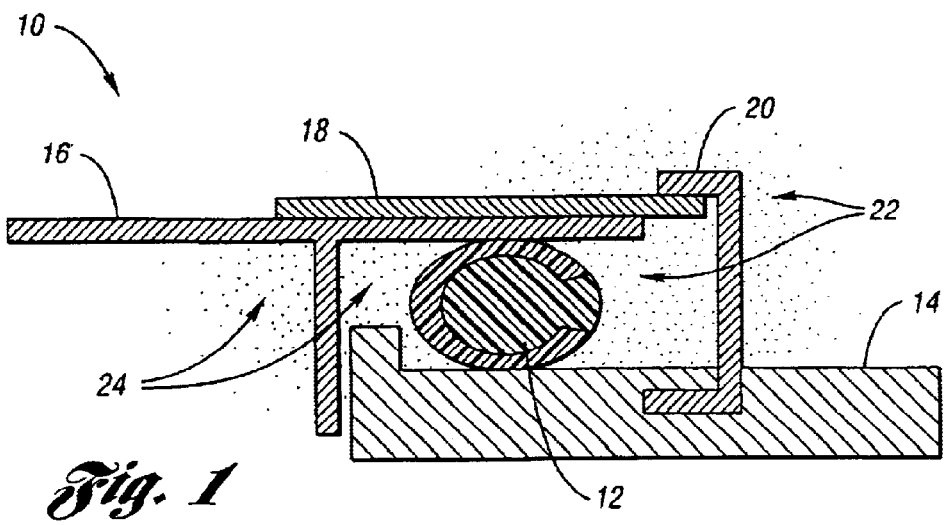
FIG. 1 is a side view of a sealing assembly having a sealing member for reducing permeation of hydrocarbons from a vessel in accordance with one embodiment of the present invention.

FIG. 1 illustrates a sealing assembly 10 having a low permeation sealing member 12 for reducing permeation of hydrocarbons from a vessel or tank 13 in accordance with one embodiment of the present invention. As shown, the sealing member 12 is disposed between a tank wall 14 of the vessel 13 and a fuel delivery module cover 16 to reduce permeation of gaseous hydrocarbon particles or molecules 24 from the vessel 13. In this embodiment, a locking ring 18 is placed over the fuel delivery module cover 16 to allow an encapsulated ring 20 to cooperate with the locking ring 18 and the tank wall 14 as known in the art, thereby securing the low permeation sealing member 12 therebetween. The low permeation sealing member 12 reduces permeation of hydrocarbon particles from escaping the vessel 13 by reducing hydrocarbon diffusion through the sealing assembly 10 and lessening micro-leaks between surfaces of the sealing member 12, the vessel 13 and the cover 16.

In this embodiment, one side of the encapsulated ring is embedded by molding into the tank wall of the vessel as typically found in the art. Another side of the encapsulated ring cooperates with the locking ring to allow radially torque to be applied resulting in a compressive load onto the sealing member. Of course, any other suitable means for disposing the fuel delivery module cover to the tank wall and applying compressive load on the sealing member may be used without falling beyond the scope or spirit of the present invention.

In this embodiment, the low permeation sealing member 12 is annularly shaped and conforms with a diameter of the vessel to which it is disposed. It is to be understood that the low permeation sealing member may take on any other suitable shape, size, and diameter based on the structural configuration of the vessel or tank to which it is to be disposed.

Figure 2:
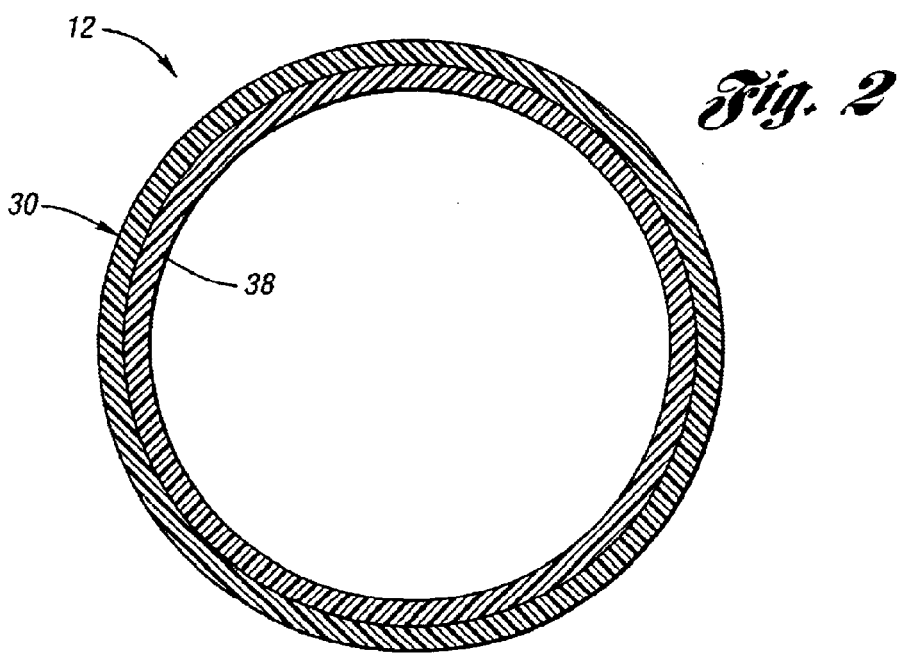
FIG. 2 is a top view of the low permeation sealing member of the sealing assembly in FIG. 1.
Figure 3:
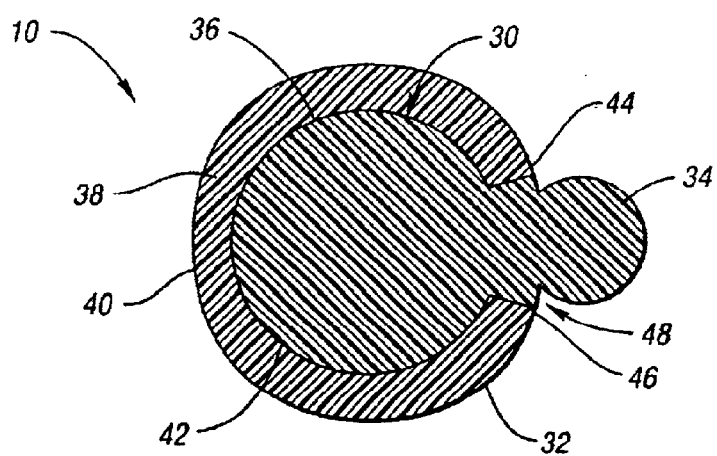
FIG. 3 is a cross-sectional view of the low permeation sealing member taken along lines 3—3 in FIG. 2.

As shown in FIGS. 2 and 3, the low permeation sealing member 12 includes an elongated elastic body 30 having a first portion 32 and a second or outer portion 34 radially integrally extending from the first portion 32. As shown, the first portion 32 includes a contact surface 36 to which a low permeation barrier layer 38 attaches. It is to be noted that outer portion 34 is an optional construction as an added bead for retaining and sealing.

FIG. 3 depicts the low permeation barrier layer 38 having an outer side 40 and an inner side 42 which adheres to contact surface 36 of the elongated body 30. The low permeation barrier layer 38 further includes a first edge 44 and an opposing second edge 46 which is spaced apart from the first edge 44 to define a slot 48. The low permeation barrier layer attaches about at least 50% of the contact surface 36 and preferably between 75%–88% about the contact surface. As shown, the low permeation barrier layer 38 partially covers the elongated body 30 at the contact surface 36 to allow the elongated body to expand through the slot during normal operation thereof.

The elongated elastic body may be comprised of any suitable elastomer such as rubber. The low permeation barrier layer may be comprised of any suitable polymeric material or elastomeric material having hydrocarbon barrier properties. This may include ethylene vinyl (EVOH), polyvinylidene fluoride (PVDF), ethylene and tetrafluoroethylene copolymer (ETVE), 60%–70% weight of a fluoroelastomer, and 60%–70% weight of a fluorocarbon.

As the low permeation barrier layer partially covers or partially encapsulates the elongated body, the formation of the slot allows the low permeation barrier layer to be outwardly biased. Moreover, the elasticity of the elongated body provides structural support, durability, and an elastic property to the barrier layer for external forces directed radially inward. Thus, the elongated elastic body provides the low permeation barrier layer with flexibility and compressibility to forces directed radially inward. This serves to aid in reducing micro-leaks between surfaces of the low permeation sealing member, the tank wall, and the fuel delivery module cover. The outer side or the second barrier layer of the low permeation barrier layer is configured to contact hydrocarbons from the vessel to reduce permeation of the hydrocarbon particles therefrom.

Figure 4:
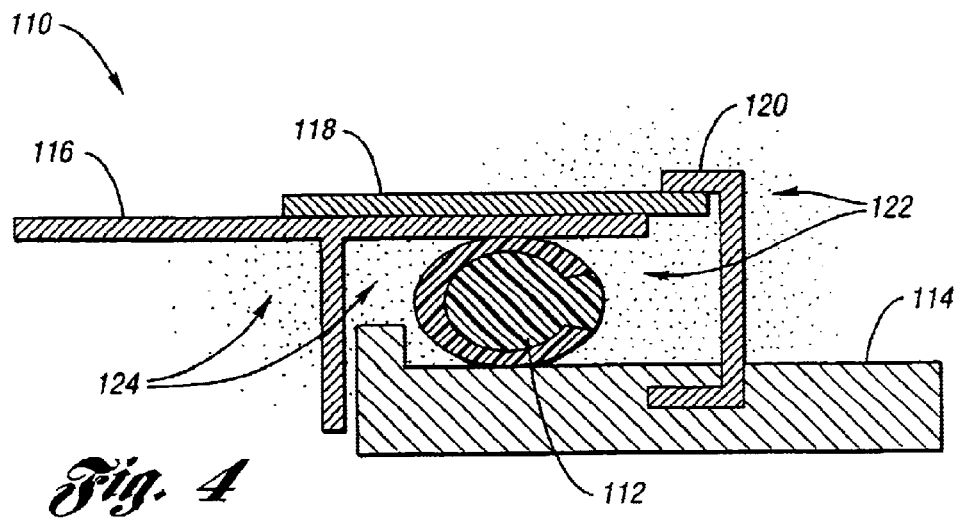
FIG. 4 is a side view of a low permeation sealing member for another sealing assembly to reduce permeation of hydrocarbons from a vessel in accordance with another embodiment of the present invention.

FIG. 4 illustrates another sealing assembly 110 having parts similar to parts of the sealing assembly 10 discussed above. For example, tank wall 14, fuel delivery module cover 16, locking rings 18 and encapsulating ring 20 of sealing assembly 10, are similar to tank wall 114, fuel delivery module cover 116, locking ring 118, and encapsulating ring 120 of sealing assembly 110.

Figure 5:
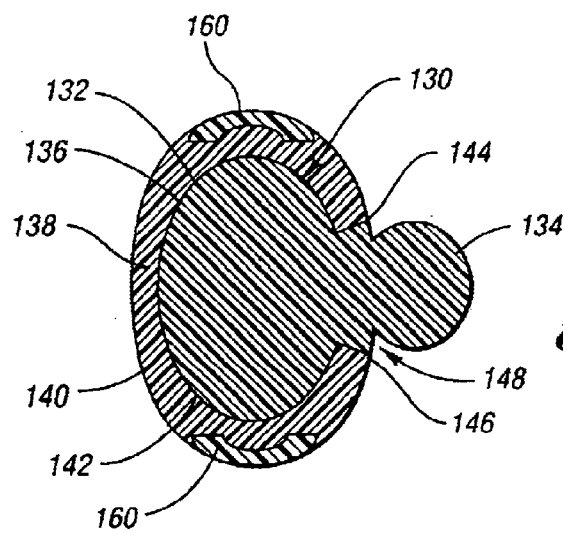
FIG. 5 is a cross-sectional view of the low permeation sealing member in FIG. 4.

As shown in FIGS. 4 and 5, sealing assembly 110 includes low permeation sealing member 112 in accordance to another embodiment of the present invention. Sealing member 112 includes an elongated body 130 having a first portion 132 and a second or outer portion 134 radially integrally extending from the first portion 132. The first portion 132 includes a contact surface 136 to which a low permeation barrier layer 138 attaches.

The low permeation barrier layer 138 includes an outer side 140 and an inner side 142 which partially covers the elongated body 130. The low permeation barrier layer 138 further includes opposing first and second edges 144, 146 which are spaced apart to define a slot 148. The low permeation barrier layer partially covers the elongated body to allow the elongated body 130 to expand through the slot 148 when hydrocarbon molecules permeate therein. The low permeation barrier layer attaches about at least 50% of the contact surface and preferably between 75%–88% about the contact surface. The outer side of the low permeation barrier layer is configured for contacting hydrocarbons from the vessel to reduce permeation of the hydrocarbons therefrom.

As shown in FIG. 5, the low permeation sealing member 112 further has a plurality of low permeation barrier portions 160 attached to the outer side 140 of the low permeation barrier layer 138. In this embodiment, each of the low permeation barrier portions 160 is comprised of low permeation barrier material including EVOH, PVDF, ETFE, 60%–70% weight of a fluoroelastomer and 60%–70% weight of a fluorocarbon. Of course, other suitable materials may also be implemented. In operation, the low permeation barrier portions 160 are configured to engage with the surfaces of the tank wall 114 and the fuel delivery module cover 116 to further reduce hydrocarbon micro-leaks therebetween as shown in FIG. 4.

Figure 6:
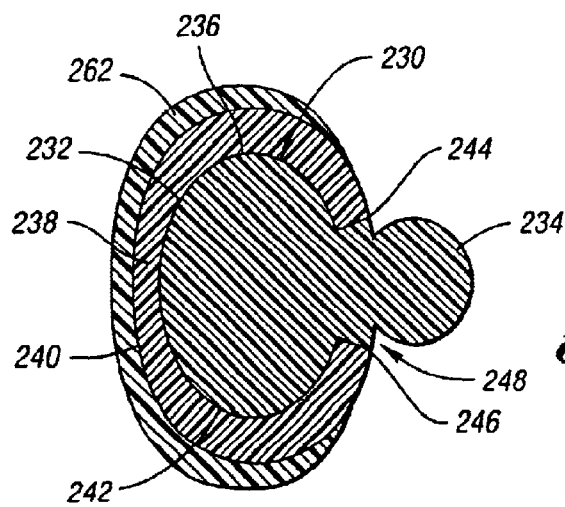
FIG. 6 is a cross-sectional view of another low permeation sealing member in accordance with another embodiment of the present invention.

As shown in FIG. 6, in another embodiment of the present invention, the low permeation sealing member may include a second barrier layer, rather than a plurality of low permeation barrier portions, made of the same material as the plurality of low permeation barrier portions discussed above. The second barrier layer 262 may be a continuous layer attached to the outer side 240 of the low permeation barrier layer 238 as shown in FIG. 6.

The low permeation barrier layer may be circumferentially disposed about the cross-section of the contact surface of the elongated body at a predetermined angle range or percent about the contact surface (discussed above). Alternatively, the range may be equal to or greater than 210° or between 190°–340° and preferably 270°–315° about the first portion of the elongated body.

In use, the low permeation barrier layer reduces diffusion of hydrocarbons through the sealing member and reduces hydrocarbon micro-leaks between the tank wall and the fuel delivery module cover. As for hydrocarbon diffusion through the sealing member, the low permeation barrier layer reduces hydrocarbon diffusion from the tank by configuring the elongated body as a barrier to hydrocarbon molecules which permeate therethrough. As hydrocarbon molecules permeate through the seal, the elongated body expands. The slot allows the elongated body to expand, avoiding undesirable cracking of the low permeation barrier layer, whose materials have lower elongation properties.

As for hydrocarbon micro-leaks, the configuration of the low permeation barrier layer partially covering the elongated body defines a radially outwardly biasing of the low permeation barrier layer. Thus, as the elongated elastic body provides structural support to the low permeation barrier layer, and also provides a durable, flexible, elastic property to the sealing member relative to compressive and inward radial forces placed thereon. Therefore, in operation, the low permeation sealing member may experience compression on the low permeation barrier layer without undesirable cracking. As a result, hydrocarbon micro-leaks are reduced.

The low permeation sealing member in accordance with the present invention may be made by any suitable means including injection molding, compression molding -and extrusion of polymers. For example, one method of making a low permeation sealing member for reducing permeation of hydrocarbons from a vessel includes extruding an elongated body having a contact surface and extruding a low permeation barrier layer partially about the contact surface of the elongated body. The low permeation barrier layer is extruded partially about the contact surface so that the low permeation barrier layer partially covers the contact surface of the elongated body. This allows the elongated body to extend through a slot defined by ends of the low permeation barrier layer for expansion of the elongated body therethrough. The method further includes cooling the elongated body and the low permeation barrier layer to define the low permeation sealing member. In another embodiment, wherein the low permeation sealing member includes a low permeation barrier portion, the method further comprises extruding a low permeation barrier portion with the low permeation barrier layer to attach thereto.

As a person skilled in the art will recognize from the previous detailed description and from the figures and claims, modifications and changes can be made to the preferred embodiments of the invention without departing from the scope of this invention defined in the following claims.

What is claimed is:

1. A low permeation sealing member for reducing permeation of hydrocarbons from a vessel, the low permeation sealing member comprising:
   an elongated body having a contact surface;
   a low permeation barrier layer attached along the contact surface of the elongated body and having opposite edges spaced apart to define a slot, the low permeation barrier layer partially covering the elongated body to allow the elongated body to expand through the slot, the low permeation barrier layer having an outer side configured for contacting hydrocarbons from the vessel to reduce permeation of hydrocarbons therefrom; and
   a low permeation barrier portion attached to the low permeation barrier layer, the low permeation barrier portion being a plurality of low permeation barrier portions attached about the low permeation barrier layer.

2. The low permeation sealing member of claim 1 wherein the elongated body includes an outer portion integrally extending from the contact surface.

3. The low permeation sealing member of claim 2 wherein the contact surface is partially covered within the low permeation barrier layer and extends through the slot to the outer portion for expansion of the elongated body therethrough.

4. The low permeation sealing member of claim 1 wherein the low permeation barrier layer has an inner side opposite the outer side, the inner side being engaged with the contact surface of the elongated body.

5. The low permeation sealing member of claim 1 wherein the low permeation barrier layer is a first low permeation barrier layer and the low permeation barrier portions are second low permeation barrier layers attached about the first low permeation barrier layer for contacting hydrocarbons to reduce permeation.

6. The low permeation sealing member of claim 1 wherein the elongated body is comprised of an elastomer.

7. The low permeation sealing member of claim 1 wherein the low permeation barrier layer comprises ethylene vinyl alcohol, polyvinylidene fluoride, or ethylene and tetrafluoroethylene copolymer.

8. The low permeation sealing member of claim 1 wherein the low permeation barrier layer comprises a fluoroelastomer or a fluorocarbon.

9. The low permeation sealing member of claim 1 wherein the low permeation barrier portion comprises ethylene vinyl alcohol, polyvinylidene fluoride, or ethylene and tetrafluoroethylene copolymer.

10. The low permeation sealing member of claim 1 wherein the low permeation barrier portion comprises a fluoroelastomer or a fluorocarbon.

11. A low permeation sealing member for reducing permeation of hydrocarbons from a vessel, the low permeation sealing member comprising:
    an elongated body having an contact surface and an outer portion integrally extending from the contact surface;
    a low permeation barrier layer extending to opposite ends and being disposed partially about the contact surface of the elongated body, the opposite edges defining an slot of the low permeation barrier layer, the low permeation barrier layer having an inner side engaged with the contact surface to partially cover the contact surface allowing the contact surface to extend through the slot to the outer portion for expansion of the elongated body therethrough, the low permeation barrier layer having an outer side configured for contacting hydrocarbons to reduce permeation; and
    a low permeation barrier portion attached to the low permeation barrier layer, the low permeation barrier portion being a plurality of low permeation barrier portions attached about the low permeation barrier layer.

12. The low permeation sealing member of claim 11 wherein the contact surface is partially covered within the low permeation barrier layer and extends through the slot to the outer portion for expansion of the elongated body therethrough.

13. The low permeation sealing member of claim 11 wherein the low permeation barrier layer is a first low permeation barrier layer and the low permeation barrier portions are second low permeation barrier layers attached about the first low permeation barrier layer for contacting hydrocarbons to reduce permeation.

14. The low permeation sealing member of claim 11 wherein the elongated body includes an elastomer.

15. The low permeation sealing member of claim 11 wherein the low permeation barrier layer includes ethylene vinyl alcohol, polyvinylidene fluoride, or ethylene and tetrafluoroethylene copolymer.

16. The low permeation sealing member of claim 11 wherein the low permeation barrier layer comprises a fluoroelastomer or a fluorocarbon.

17. The low permeation sealing member of claim 11 wherein the low permeation barrier portion comprises ethylene vinyl alcohol, polyvinylidene fluoride, or ethylene and tetrafluoroethylene copolymer.

18. The low permeation sealing member of claim 11 wherein the low permeation barrier portion comprises a fluoroelastomer or a fluorocarbon.

* * * * *